(12) United States Patent
Deane

(10) Patent No.: US 8,147,250 B2
(45) Date of Patent: *Apr. 3, 2012

(54) COOCCURRENCE AND CONSTRUCTIONS

(75) Inventor: Paul Deane, Lawrenceville, NJ (US)

(73) Assignee: Educational Testing Service, Princeton, NJ (US)

(*) Notice: Subject to any disclaimer, the term of this patent is extended or adjusted under 35 U.S.C. 154(b) by 967 days.

This patent is subject to a terminal disclaimer.

(21) Appl. No.: 12/061,395

(22) Filed: Apr. 2, 2008

(65) Prior Publication Data

US 2008/0183463 A1 Jul. 31, 2008

Related U.S. Application Data

(63) Continuation of application No. 10/915,881, filed on Aug. 11, 2004, now Pat. No. 7,373,102.

(60) Provisional application No. 60/494,181, filed on Aug. 11, 2003.

(51) Int. Cl.
G09B 11/00 (2006.01)

(52) U.S. Cl. .......................................... 434/169; 704/10

(58) Field of Classification Search .................. 434/323, 434/350, 353; 704/9, 10
See application file for complete search history.

(56) References Cited

U.S. PATENT DOCUMENTS

| | | | |
|---|---|---|---|
| 5,675,819 | A | 10/1997 | Schuetze |
| 6,181,909 | B1 | 1/2001 | Burstein et al. |
| 6,366,759 | B1 | 4/2002 | Burstein et al. |
| 6,424,983 | B1 | 7/2002 | Schabes et al. |
| 6,581,056 | B1 | 6/2003 | Rao |
| 6,847,966 | B1 | 1/2005 | Sommer et al. |
| 2003/0200077 | A1 | 10/2003 | Leacock et al. |
| 2004/0030540 | A1 | 2/2004 | Ovil et al. |

FOREIGN PATENT DOCUMENTS

EP 1462950 9/2004

OTHER PUBLICATIONS

International Search Report of PCT Application No. PCT/US2004/026297, Jul. 11, 2005, 2 pages.
Anglin, Jeremy; Vocabulary Development: A Morphological Analysis; Monographs of the Society for Research in Child Development; Serial 238, vol. 58(10); pp. 1-186; 1993.
Bencini, Giulia, Goldberg, Adele; The Contribution of Argument Structure Constructions to Sentence Meaning; Journal of Memory and Language, 43; pp. 640-651; 2000.
Bloomfield, Leonard; Language; Holt, Rinehart & Winston, Inc.: New York, NY; 1933.

(Continued)

Primary Examiner — Kathleen Mosser
(74) Attorney, Agent, or Firm — Jones Day

(57) ABSTRACT

A method and system for performing automatic text analysis is described. A local ranking for one or more contexts with respect to a word and a global ranking for one or more contexts are generated. The rankings are based on the frequency with which the contexts appear in a corpus. A statistic may be generated using the local and global rankings, such as a log ratio rank statistic equal to the logarithm of the global rank divided by local rank, to measure the similarity of contexts with respect to words with which they combine. A source matrix of word to context values is then created. Singular value decomposition is used to create sub-matrices from the source matrix. Vectors from the sub-matrices corresponding to context(s) and/or word(s) are then selected to determine term-term or context-context similarity or term-context correspondence.

33 Claims, 2 Drawing Sheets

OTHER PUBLICATIONS

Burgess, Curt, Lund, Kevin; Modeling Parsing Constraints with High-Dimensional Context Space; Language and Cognitive Processes, 12(2/3); pp. 177-210; 1997.

Burgess, Curt, Lund, Kevin; Modeling Cerebral Asymmetries in High-Dimensional Space; in Right Hemisphere Language Comprehension: Perspectives From Cognitive Neuroscience, M. Beeman & C. Chiarello (Eds.); Lawrence Erlbaum Associates: Mahwah, NJ; pp. 215-244; 1998.

Burstein, Jill, Chodorow, Martin; Automated Essay Scoring for Nonnative English Speakers; Joint Symposium of the Association of Computational Linguistics and the International Association of Language Learning Technologies, Workshop on Computer-Mediated Language Assessment and Evaluation of Natural Language Processing; College Park, Maryland; pp. 68-75; 1999.

Burstein, Jill, Kukich, Karen, Wolff, Susanne, Lu, Chi, Chodorow, Martin, Braden-Harder, Lisa, Harris, Mary Dee; Automated Scoring Using a Hybrid Feature Identification Technique; Proceedings of the Annual Meeting of the Association of Computational Linguistics; Montreal, Canada; pp. 206-210; 1998.

Burstein, Jill, Kukich, Karen, Wolff, Susanne, Lu, Chi, Chodorow, Martin; Enriching Automated Essay Scoring Using Discourse Marking; Proceedings of the Workshop on Discourse Marking and Discourse Relations, Annual Meeting of the Association of Computational Linguistics; Montreal, Canada; pp. 15-21; 1998.

Burstein, Jill, Kukich, Karen, Wolff, Susanne, Lu, Chi, Chodorow, Martin; Computer Analysis of Essays; NCME Symposium on Automated Scoring; 1998.

Burstein, Jill, Leacock, Claudia, Swartz, Richard; Automated Evaluation of Essays and Short Answers; Paper presented at 5th International Computer Assisted Assessment Conference; Loughborough, UK; 2001.

Burstein, Jill, Leacock, Claudia, Chodorow, Martin; Criterion Online Essay Evaluation: An Application for Automated Evaluation of Student Essays; Proceedings of the 15th Annual Conference on Innovative Applications of Artificial Intelligence, Acapulco, Mexico, 2003.

Burstein, Jill, Marcu, Daniel, Andreyev, Vyacheslav, Chodorow, Martin; Towards Automatic Classification of Discourse Elements in Essays; Proceeding of the 39th Annual Meeting of the Association of Computational Linguistics; Toulouse, France; 2001.

Chomsky, Noam; A Review of B.F. Skinner's Verbal Behavior; Language, 35(1); pp. 26-58; 1959.

Collins, Michael; A New Statistical Parser Based on Bigram Lexical Dependencies; In ACL, 34; pp. 184-191; 1996.

Collins, Michael; Three Generative, Lexicalized Models for Statistical Parsing; In ACL, 35/EACL 8; pp. 16-23; 1997.

Curran, James, Moens, Marc; Scaling Context Space; Proceedings of the 40th Annual Meeting of the Association for Computational Linguistics; Philadelphia, PA; pp. 231-238; 2002.

Deane, Paul; Grammar in Mind and Brain: Explorations in Cognitive Syntax; Mouton de Gruyter: Berlin; 1992.

Dorr, Bonnie, Jones, Doug; Role of Word Sense Disambiguation in Lexical Acquisition: Predicting Semantics from Syntactic Cues; Proceedings of the 16th International Conference on Computational Linguistics; Copenhagen; 1996.

Ersan, Murat, Charniak, Eugene; A Statistical Syntactic Disambiguation Program and What It Learns; Brown University, Department of Computer Science Report CS-95-29; 1995.

Fillmore, Charles; Grammatical Construction Theory and the Familiar Dichotomies; In Language Processing in Social Context, R. Dietrich & C. Graumann (Eds.); North-Holland: Amsterdam; pp. 17-38; 1989.

Finch, Steve, Chater, Nick, Redington, Martin; Acquiring Syntactic Information from Distributional Statistics; Ch. 12 in Connectionist Models of Memory and Language, J. Levy, D. Bairaktaris, J. Bullinaria & P. Cairns (Eds.); UCL Press: London, UK; pp. 229-242; 1995.

Hovav, Malka Rappaport, Levin, Beth; Building Verb Meanings; Chapter 4, Lexical and Compositional Factors, M. Butt & W. Geuder (Eds.); CSLI: Stanford, CA; pp. 97-134; 1998.

Hughes, John, Atwell, Eric; Automatically Acquiring and Evaluating a Classification of Words; Centre for Computer Analysis of Language and Speech, University of Leeds, UK, School of Computer Studies; 1994.

Laham, Darrell; Latent Semantic Analysis Approaches to Categorization; Poster presented at the 19th Annual Meeting of the Cognitive Science Society; 1997.

Landauer, Thomas, Dumais, Susan; A Solution to Plato's Problem: The Latent Semantic Analysis Theory of the Acquisition, Induction, and Representation of Knowledge; Psychological Review, 104(2); pp. 211-240; 1997.

Langacker, Ronald; Concept, Image, and Symbol: The Cognitive Basis of Grammar; Mouton de Gruyter: Berlin; 1990.

Lapata, Maria; Acquiring Lexical Generalizations from Corpora: A Case Study for Diathesis Alternations; Proceedings of the 37th Annual Meeting of the Association for Computational Linguistics; pp. 397-404; 1999.

Lee, Lillian; Measures of Distributional Similarity; In 37th Annual Meeting of the Association for Computational Linguistics; Morgan Kaufmann Publishers: Los Altos, CA; pp. 25-32; 1999.

Lund, Kevin, Burgess, Curt; Producing High-Dimensional Semantic Spaces From Lexical Co-Occurrence; Behavioral Research Methods, Instruments & Computers, 28(2); pp. 203-208; 1996.

Lund, Kevin, Burgess, Curt, Atchley, Ruth Ann; Semantic and Associative Priming in High-Dimensional Semantic Space; Proceedings of the Cognitive Science Society; pp. 660-665; 1995.

Magerman, David; Natural Language Parsing as Statistical Pattern Recognition; Ph.D. Thesis, Stanford University, US; 1994.

Magerman, David; Statistical Decision-Tree Models for Parsing; Proceedings of the 33rd Annual Meeting of the ACL; pp. 276-283; 1995.

Pantel, Patrick, Lin, Dekang; Discovering Word Senses From Text; Proceedings of the 8th ACM SIGKDD Conference on Knowledge Discovery and Data Mining; Edmonton, Canada; pp. 613-619; 2002.

Pinker, Steven; Language Learnability and Language Development; Harvard University Press: Cambridge, MA; 1984.

Powers, Donald, Burstein, Jill, Chodorow, Martin, Fowles, Mary, Kukich, Karen; Stumping E-rater: Challenging the Validity of Automated Essay Scoring; GRE Board Professional Report No. 98-08bP; Educational Testing Service Research Report 01-03; Princeton, NJ; 2001.

Resnik, Philip; Selection and Information: A Class-Based Approach to Lexical Relationships; Ph.D. Thesis, University of Pennsylvania, US; 1993.

Saussure, Ferdinand de; Cours de Linguistique Generale; English Translation by Wade Baskin, Course in General Linguistics; Philosophical Library: New York, NY (1959); 1916.

Schunn, Christian; The Presence and Absence of Category Knowledge in LSA; Proceedings of the 21st Annual Meeting of the Cognitive Science Society; Lawrence Erlbaum Associates: Mahwah, NJ; 1999.

Schutze, Hinrich; Word Space; Advances in Neural Information Processing Systems 5, S. Hanson, J. Cowan & C. Gils (Eds.); Morgan Kaufmann: San Mateo, CA; pp. 895-902; 1993.

Brooks, Patricia, Tomasello, Michael; How Children Constrain Their Argument Structure Constructions; Language, 75(4); pp. 720-738; 1999.

Buchanan, Lori, Burgess, Curt, Lund, Kevin; Overcrowding in Semantic Neighborhoods: Modeling Deep Dyslexia; Brain and Cognition, 32; pp. 111-114; 1996.

Burstein, Jill; The E-rater Scoring Engine: Automated Essay Scoring with Natural Language Processing; Ch. 7 in Automated Essay Scoring: A Cross-Disciplinary Perspective, M. Shermis & J. Burstein (Eds.); Lawrence Erlbaum Associates: Mahwah, NJ; pp. 113-122; 2003.

Church, Kenneth, Gale, William, Hanks, Patrick, Hindle, Donald, Moon, Rosamund; Lexical Substitutability; Ch. 6 in Computational Approaches to the Lexicon, B. Atkins & A. Zampolli (Eds.); Oxford University Press: Cambridge, UK; pp. 153-180; 1994.

Fillmore, Charles; The Mechanism of 'Construction Grammar'; Proceedings of the 14th Annual Meeting of the Berkeley Linguistic Society; pp. 35-55; 1988.

Fillmore, Charles, Kay, Paul, O'Connor, Mary Catherine; Regularity and Idiomaticity in Grammatical Constructions: The Case of Let Alone; Language, 64(3); pp. 501-538; 1988.

Goldberg, Adele; A Construction Grammar Approach to Argument Structure; University of Chicago Press: Chicago, IL; 1995.

Grefenstette, Gregory; Use of Syntactic Context to Produce Term Association Lists for Text Retrieval; in SIGIR '92; pp. 89-97; 1992.

Grefenstette, Gregory; Explorations in Automatic Thesaurus Discovery; Kluwer Academic Press: Boston, MA; 1994.

Kay, Paul, Fillmore, Charles; Grammatical Constructions and Linguistic Generalizations: The What's X Doing Y? Construction; Language 75(1); pp. 1-33; 1999.

Landauer, Thomas; On the Computational Basis of Learning and Cognition: Arguments from LSA; Ch. 13 in the Psychology of Learning and Motivation, 41, N. Ross (Ed.); pp. 43-84; 2002.

Leacock, Claudia, Chodorow, Martin; Automated Grammatical Error Detection; Ch. 12 in Automated Essay Scoring: A Cross-Disciplinary Perspective, M. Shermis & J. Burstein (Eds.); Lawrence Erlbaum Associates: Mahwah, NJ; pp. 195-207; 2003.

Leacock, Claudia, Chodorow, Martin; C-rater: Automated Scoring of Short-Answer Questions; Computers and the Humanities, 37; pp. 389-405; 2003.

Lin, Dekang; Automatic Retrieval and Clustering of Similar Words; Proceedings of the 35th Annual Meeting of the Association for Computational Linguistics; Montreal, Canada; pp. 768-774; 1998.

Manning, Christopher, Schutze, Hinrich; Foundations of Statistical Natural Language Processing; MIT Press: Cambridge, MA; 1999.

Michaelis, Laura, Lambrecht, Knud; Toward a Construction-Based Theory of Language Function: The Case of Nominal Extraposition; Language, 72(2); pp. 215-247; 1996.

Schutze, Hinrich; Context Space; Working Notes of the AAAI Fall Symposium on Probabilistic Approaches to Natural Language, R. Goldman, P. Norvig, E. Charniak & B. Gale (Eds.); AAAI Press: Menlo Park, CA; pp. 113-120; 1992.

Tomasello, Michael, Brooks, Patricia; Early Syntactic Development: A Construction Grammar Approach; Ch. 7 in the Development of Language, M. Barret (Ed.); Psychology Press; pp. 161-190; 1999.

Zipf, George; The Psycho-Biology of Language; Houghton Mifflin: Boston, MA; 1935.

COOCCURRENCE AND CONSTRUCTIONS

CLAIM OF PRIORITY

This application is a continuation of U.S. patent application Ser. No. 10/915,881 filed Aug. 11, 2004, now U.S. Pat. No. 7,373,102, which claims priority to U.S. Provisional Patent Application Ser. No. 60/494,181, filed Aug. 11, 2003, entitled "Cooccurrence and Constructions," each of which is incorporated herein by reference in its entirety.

BACKGROUND

One of the striking developments in computational linguistics in recent years has been the rapid progress in the automatic analysis of text. This is especially so where the extraction of semantic content is concerned. The adoption of statistical, corpus-based techniques within natural language processing, the continued development of information extraction techniques, and the emergence of more effective algorithms for extracting particular aspects of linguistic and discourse structure have largely driven such progress. Such algorithms include topic chains and rhetorical argument structures.

Effective applications have become a reality in a variety of fields, such as machine translation and automatic summarization, due to the progress of automated text analysis applications. However, current automated text analysis applications tend to rely almost solely on lexical cooccurrence, a simple form of linguistic evidence, with very little analysis beyond the application of straightforward statistical techniques.

For example, the E-Rater™ essay scoring system, described in U.S. Pat. Nos. 6,181,909 and 6,366,759 to Burstein et al., which are incorporated herein by reference in their entireties, identifies aspects of the content, style and rhetorical structure of essays by using content vectors to induce simple measures of how closely the vocabulary in target essays matches the vocabulary usage of essays in a training set. The Criterion™ essay feedback system provides feedback regarding potential grammatical errors to student writers by identifying word bigrams with low mutual information (i.e., identifying word cooccurrences with unexpectedly low probability). The C-Rater™ short answer scoring system, described in U.S. Patent Publication No. 2003/0200077 by Leacock et al., which is incorporated herein by reference in its entirety, automatically scores short-answer questions by matching answers with an instructor rubric by using word similarity scores derived from corpus cooccurrence frequencies to support detection of paraphrase. Each of the E-Rater™, Criterion™ and C-Rater™ systems are the property of the Educational Testing Service.

An instance in which cooccurrence data is used independently of linguistic structure is Latent Semantic Analysis (LSA), which makes use only of word cooccurrence within the same document to produce calculations of semantic similarity. LSA similarity scores are generated by applying singular value decomposition to matrices representing the log of raw word frequency by document. The resulting matrices can be used to generate cosine similarity scores indicating how similar two words are in their distribution across documents, or how similar two documents are in their choice of vocabulary.

Generally, cooccurrence-based similarity metrics seem to correlate with various psycholinguistic measures. However, when cooccurrence-based methods, such as LSA, fail, their failures are generally unlike degraded human performance (e.g., LSA judgments of semantic similarity can return highly valued word pairs where no reviewer can perceive a connection) and the correlations with human judgments are sometimes relatively weak.

While cooccurrence data alone can provide approximately 70 to 90 percent accuracy in some applications, such as parsing, and in complex applied tasks, such as essay scoring, improvement beyond such accuracy cannot likely be achieved without resort to additional linguistic measures. This is so because, for example, the addition or subtraction of a single word can completely change the interpretation of an entire expression. Accordingly, the limitations of systems depending solely on cooccurrence data are evident.

Extensive literature addresses systems that use cooccurrence data to measure the distributional similarity of words. Such systems typically collect cooccurrence statistics, such as bigram and trigram frequency counts, word by document frequency counts or frequency of word-word relationships from a grammatically analyzed corpus. Some systems then apply an analytical step, such as singular value decomposition, to improve the quality of the data. A similarity or dissimilarity metric, such as cosine similarity, the Kullback-Leibler divergence or the like, is then applied to yield a ranking which estimates the degree to which any pair of words have similar or dissimilar distributions.

Such systems have well known limitations and problems. First, the results are only as good as the corpus used for training. Second, the results are far more reliable for common words than for words that are more rare due to a scarcity of data. Finally, these systems ignore important linguistic distinctions such as the difference between different senses of the same word. Accordingly, the outputs of such systems are typically noisy (i.e., words/phrases having low similarity often appear in result lists).

What are needed are methods and systems for improving the accuracy of text analysis over methods and systems solely using lexical cooccurrence.

A need exists for methods and systems of automatically analyzing text using measurements of lexical structure.

A further need exists for methods and systems for determining the fundamental organizational properties of grammar.

The present invention is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "context" is a reference to one or more contexts and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method for ranking contexts within which a word in a corpus appears includes, for each word in a corpus, determining a local ranking for each of one or more contexts, for each context, determining a global ranking, computing a statistic for each context based on one or more of the local ranking and the global ranking, and ordering the one or more contexts based on the computed statistic for each context. The local ranking may include an ordering based on the frequency with which the word appears with each context. The global ranking may include an ordering based on the overall frequency of each context in the corpus. The computed statistic may include a log rank ratio statistic. The log rank ratio statistic for a context with respect to a word may equal the logarithm of the global rank for the context divided by the local rank for the context with the word.

In an embodiment, a method for ranking contexts within which a word in a corpus appears includes, for each word in a corpus, determining a local ranking for each of one or more contexts, for each context, determining a global ranking, computing a statistic for each context based on one or more of the local ranking and the global ranking, and producing a source matrix of words by contexts in which an attribute of each context is used as a value for a context-word combination. The local ranking may include an ordering based on the frequency with which the word appears with each context. The global ranking may include an ordering based on the overall frequency of each context in the corpus. The computed statistic may include a log rank ratio statistic. Each value may include a log rank ratio statistic or a frequency for the context in the corpus.

In an embodiment, the method further includes generating a term matrix, a factor-weighting matrix and a content matrix from the source matrix. The method may further include computing term-term similarity based on a term vector for each term from the term matrix and a weight vector for each term from the factor-weighting matrix. The method may further include computing context-context similarity based on a context vector for each context from the content matrix and a weight vector for each context from the factor-weighting matrix. The method may further include computing term-context correspondence based on a term vector for the term from the term matrix, a context vector for the context from the content matrix, and a weight vector from the factor-weighting matrix.

In an embodiment, a system for ranking contexts within which a word in a corpus appears includes a processor and a processor-readable storage medium operably connected to the processor. The processor-readable storage medium contains one or more programming instructions for performing a method for ranking contexts within which a word in a corpus appears including, for each word in a corpus, determining a local ranking for each of one or more contexts, for each context, determining a global ranking, computing a statistic for each context based on the local ranking and the global ranking, and ordering the one or more contexts based on the computed statistic for each context. The local ranking may include an ordering based on the frequency with which the word appears with each context. The global ranking may include an ordering based on the overall frequency of each context in the corpus. The computed statistic may include a log rank ratio statistic.

In an embodiment, a system for ranking contexts within which a word in a corpus appears includes a processor, and a processor-readable storage medium operably connected to the processor. The processor-readable storage medium contains one or more programming instructions for performing a method for ranking contexts within which a word in a corpus appears including, for each word in a corpus, determining a local ranking for each of one or more contexts, for each context, determining a global ranking, computing a statistic for each context based on the local ranking and the global ranking, and producing a source matrix of words by contexts in which an attribute of each context is used as a value for a context-word combination. The local ranking may include an ordering based on the frequency with which the word appears with each context. The global ranking may include an ordering based on the overall frequency of each context in the corpus. The computed statistic may include a log rank ratio statistic. Each value may include a log rank ratio statistic or a frequency for the context in the corpus.

In an embodiment, the processor-readable storage medium further contains one or more programming instructions for generating a term matrix, a factor-weighting matrix and a content matrix from the source matrix. The processor-readable storage medium may further contain one or more programming instructions for computing term-term similarity based on a term vector for each term from the term matrix and a weight vector for each term from the factor-weighting matrix. The processor-readable storage medium may further contain one or more programming instructions for computing context-context similarity based on a context vector for each context from the content matrix and a weight vector for each context from the factor-weighting matrix. The processor-readable storage medium may further contain programming instructions for computing term-context correspondence based on a term vector for the term from the term matrix, a context vector for the context from the content matrix, and a weight vector from the factor-weighting matrix.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
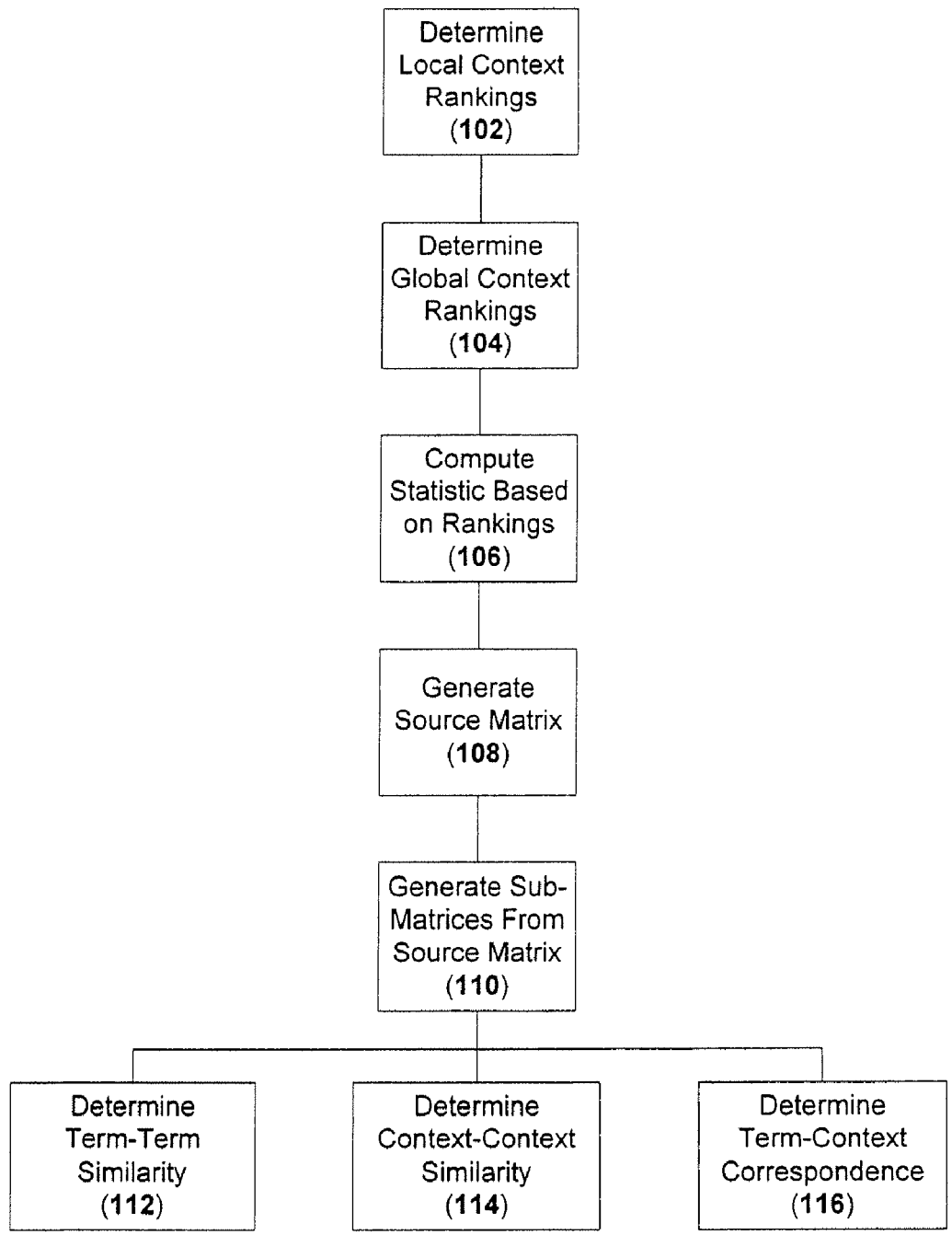
FIG. 1 depicts an exemplary flow diagram for a method for ordering contexts according to an embodiment.

English grammar is a collection of grammatical constructions, such that each grammatical English word or phrase is licensed by one or more constructions. A linguistic expression is ungrammatical if no combination of grammatical constructions capable of licensing the expression exists. In proper English grammar, a construction may define phrases of a particular type by specifying that they can contain a constituent of a certain kind placed in a certain relationship to a constituent of another kind to form a particular kind of phrase. Thus, constructions have an internal part, which specifies the kinds of constituents that can combine with each other, and an external part, which specifies the kind of constituent that results from the combination.

With respect to cooccurrence, constructions may be similar to words. Constructions may be assigned meanings, syntactic properties and organizations, and have semantic contribution and discourse functions. Accordingly, postulating a grammatical construction implies a well-defined set of cooccurrence patterns in linguistic data.

The frequency of a linguistic category may tend to be inversely proportional to its rank in the frequency distribution (i.e., $f=k/r$, where k is a constant). Thus, while a small set of words appear often enough to provide the bulk of the statistical data, most words may appear so seldom that it is difficult to obtain reliable statistical information. The basic pattern of this formula may apply more profoundly to word combinations. In other words, the frequency of word pairs may drop off more quickly than the frequency of words, and the frequency of word triplets may drop off even more rapidly.

However, word sequences that correlate with constructions are among the more frequent in the language. For example, sequences such as "him the" or "me this" include only function words, the most frequently used English words, and have a very high overall frequency. Rarer constructions may be reliably identified by word sequences which, though low in overall frequency, are quite frequent with some words (e.g., combinations of a possessive pronoun with the noun "way").

If the distribution of alternative words occupying the same slot in the same construction is examined, relatively few words may account for most instances of the construction. While a broad range of words are compatible with a construction, most words seldom appear in the construction. Moreover, if a word is distributed among the alternate constructions with which it is associated, most instances of the word appear in relatively few constructions despite the word being able to appear in a large set of constructions. Examining the distribution of constructions by counting bigrams or trigrams that indicate the construction's presence illustrates these points.

A vector space method may be used to calculate, for example, context-context similarities for words in a corpus. The context of a word may include a word sequence or attribute of a word sequence that is associated with a particular instance of a word in a corpus or document. The context may include a word or words appearing just before or after the particular word, other words that modify the particular word, and the like.

In an embodiment, contexts are instantiated as (a) the immediately preceding word; (b) the immediately preceding two word sequence; (c) the word immediately before and the word immediately after in combination; (d) the immediately following word; and (e) the immediately following two word sequence. Other contexts may be used without limitation. The following data may be collected based on the contexts: (a) the total frequency of each word-context combination in the corpus and (b) the total frequency with which each context appears with any word in the corpus.

Contexts may be ranked based on the word with which they are associated in each instance. In an embodiment, two rankings are applied. The first ranking may be a local ranking, which simply orders the contexts by their frequency with each word. In other words, if the context "appearing before barked" appeared so often with the word dog that it was the most frequent context, it would have local rank one. If "appearing after the" were the next most frequent context with dog, it would receive local rank two, and so forth. If two or more contexts have equal local frequencies, the contexts may be assigned a rank equal to the average of the ranks the contexts would occupy if their frequencies were distinct.

The second ranking may be a global ranking, which orders the contexts which actually appear with a word by the overall frequency of the contexts in the corpus. In other words, if the context "appearing before barked" appeared a total of fifty times in the corpus, and "appearing after the" appeared a total of fifty thousand times in the corpus, the latter would be assigned a higher global rank than the former. If two or more contexts have equal global frequencies, the contexts may be assigned a rank equal to the average of the ranks the contexts would occupy if their frequencies were distinct.

FIG. 1 depicts an exemplary flow diagram for a method for ordering contexts according to an embodiment. As shown in FIG. 1, each context may be assigned a local rank 102 and a global rank 104. A statistic, such as a log rank ratio statistic, may then be computed 106 for each context. The log rank ratio statistic may be the logarithm of the global rank divided by the local rank. The log rank ratio statistic may be used to identify contexts which are particularly characteristic of a word since it evaluates the significance of an entire set of contexts against one another. In an embodiment, the contexts may be ordered based on the log rank ratio statistic.

Once all contexts are determined for the words in a corpus, a matrix of words by contexts may be produced 108 in which some attribute of the contexts are used as values. In an embodiment, the value is equal to the frequency of each context in the corpus. In an alternate embodiment, the value is equal to the log rank ratio statistic.

Singular value decomposition ("SVD") may then be applied to the matrix (or to a sub-matrix reduced to a size small enough to be computationally feasible). Any number of factors may be extracted by using singular value decomposition. The source matrix may be used to generate 110, for example, three sub-matrices, such as: (a) a term matrix, (b) a factor-weighting matrix and (c) a content matrix. When the three sub-matrices are multiplied together, the result may approximate the values observed in the source matrix, with generalizations induced by the compression of the information into a smaller number of dimensions.

Given the vectors in the term matrix, similarity of terms to terms may be induced 112 by the cosine of the angle between vectors in factor space. Cosine similarity in the term matrix may be the basis for term-term similarities. In other words, if T stands for the vector associated with a term in term space, and S is the factor weight vector, the dot product $T \cdot S \cdot S \cdot T$ may be computed to determine the cosine similarity between two terms.

Given the vectors in the context matrix, similarity of contexts to contexts may be induced 114 similarly to the similarity of terms. If D stands for the vector associated with a context in context space, and S is the factor vector weight, the dot product $D \cdot S \cdot S \cdot D$ may be produced to determine the context-context similarity.

Given a context, terms that fit a context well may be determined 116 by taking the cosine of the context vector for that context against each term vector. This may be used to estimate the class of words that are most strongly associated with each context. In other words, if T stands for the term's vector in term space, D stands for the context's vector in vector space, and S stands for the factor weighting, the dot product $T \cdot S \cdot D$ may be used to compute cosine similarity.

SVD analysis may be performed for training purposes on part of a corpus. For example, the N most frequent words may be used. The SVD may then be extended to the remaining words or contexts in the corpus by exploiting the interdependence between term and context vectors. In other words, given a vector representing the raw context data for a word not appearing in the original SVD analysis, the product of the vector and the context matrix may be computed to obtain a term vector for the word in factor space.

For contexts with equal numbers of elements, the degree to which they are parallel may be estimated by term-term similarity of the parts. For example, if the starting context is mrs. _____, the similarity of the starting context with another context, such as dr. _____ or john _____ may be estimated by computing the cosine between the factor vectors of mrs. and dr. or john. Similarly, the cosine may be computed for each subsequent word in a context.

In an embodiment, inferring potential constructions or grammatical patterns may be performed using context data. A list of contexts similar to the original context may be produced. Contexts that do not have a parallel basic structure (i.e., the same number of words with the open position in the same location) may be removed. The cosine may then be computed between component words of the original context and the word in the parallel position in the other context. Contexts where the cosine values fall below a threshold may be rejected. Using the resulting list of contexts, the vectors for each word in each list of words that fill the same position in each context may then be summed. The sum may be used to induce a context vector for that position. As a result, a sequence of context vectors that select the appropriate words may be computed for each position in the construction.

The similarity and/or correspondence data may be used to select an optimal context, a subset of contexts, an optimal word and/or a subset of words from the corpus for reasons known to those skilled in the art. In addition, the data may be used to make determinations regarding contexts within text, such as an essay or a short answer to an assessment examination question, that is analyzed in light of the corpus for reasons known to those skilled in the art. Such determinations may include verifying grammatical correctness or word choice as part of evaluating the text.

Figure 2:
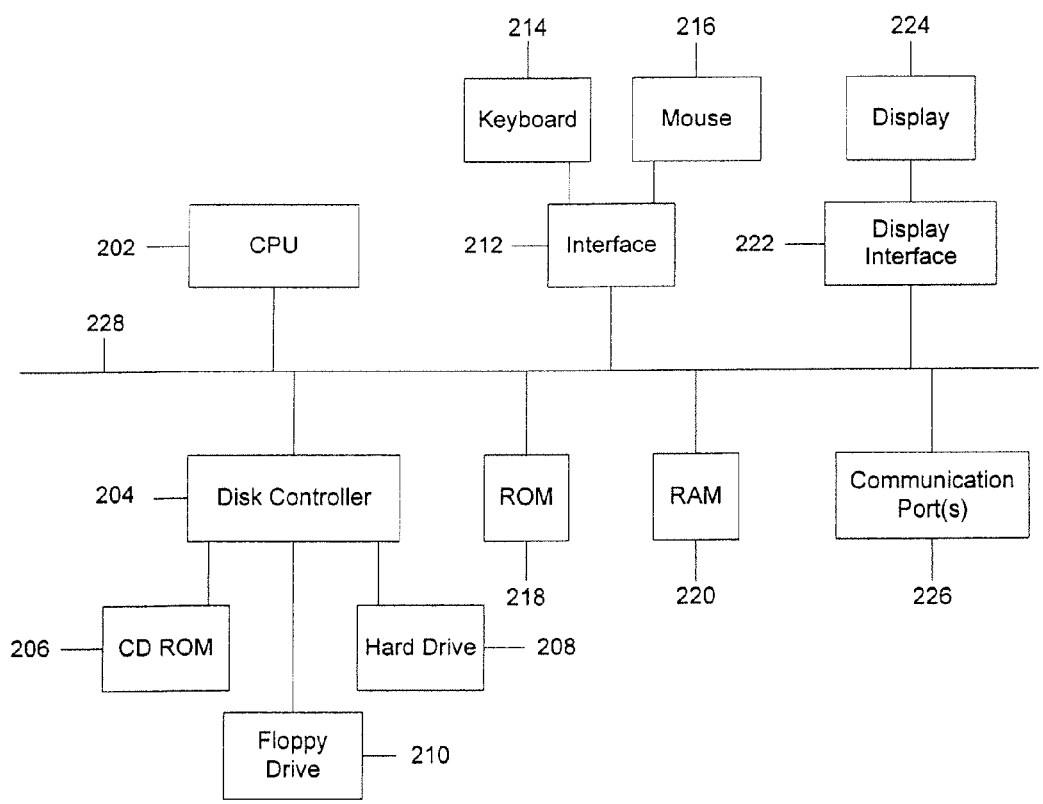
FIG. 2 is a block diagram of exemplary internal hardware that may be used to contain or implement the program instructions of a system embodiment.

FIG. 2 is a block diagram of exemplary internal hardware that may be used to contain or implement the program instructions of a system embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary processor-readable storage devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the operations of the present invention. Likewise, a multiprocessor system may optionally be used to perform one, some or all of the operations of the present invention.

While the present invention has been described in conjunction with particular methods and applications as outlined above, it is evident that many alternatives, modifications and variations will be apparent to one of ordinary skill in the art. Accordingly, the particular applications of this invention as set forth above are intended to be illustrative, not limiting. Modifications or changes may be made without departing from the spirit or scope of the invention, or may become obvious to one skilled in the art after review of the present invention. Such modifications or changes are intended to be included within the scope of this present application.

What is claimed is:

1. A computer-implemented method for generating an automated evaluation of a corpus by ranking contexts within which a word in said corpus appears, comprising:
for each word in said corpus, determining with a computer a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;
for each context, determining a global ranking;
computing with the computer a statistic for each context based on one or more of the local ranking and the global ranking;
ordering with the computer the one or more contexts based on the computed statistic for each context; and
deriving with the computer said automated evaluation from said ordered one or more ordered contexts.

2. The method of claim 1 wherein the global ranking includes an ordering based on the overall frequency of each context in the corpus.

3. The method of claim 1 wherein the computed statistic comprises a log rank ratio statistic, wherein the log rank ratio statistic for a context with respect to a word equals the logarithm of the global rank for the context divided by the local rank for the context with the word.

4. A computer-implemented method for generating an automated evaluation of a corpus by ranking contexts within which a word in said corpus appears, comprising:
for each word in a corpus, determining with a computer a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;
for each context, determining with the computer a global ranking;
computing with the computer a statistic for each context based on one or more of the local ranking and the global ranking;
producing with the computer a source matrix of words by contexts in which an attribute of each context is used as a value for the context-word combination; and
deriving with the computer said automated evaluation from said source matrix of words by contexts.

5. The method of claim 4 wherein the global ranking includes an ordering based on the overall frequency of each context in the corpus.

6. The method of claim 4 wherein the computed statistic comprises a log rank ratio statistic, wherein the log rank ratio statistic for a context with respect to a word equals the logarithm of the global rank for the context divided by the local rank for the context with the word.

7. The method of claim 4 wherein each value comprises a frequency for the context in the corpus.

8. The method of claim 4, further comprising:
generating a term matrix, a factor-weighting matrix and a content matrix from the source matrix.

9. The method of claim 8, further comprising:
computing term-term similarity based on a term vector for each term from the term matrix and a weight vector for each term from the factor-weighting matrix.

10. The method of claim 8, further comprising:
computing context-context similarity based on a context vector for each context from the content matrix and a weight vector for each context from the factor-weighting matrix.

11. The method of claim 8, further comprising:
computing term-context correspondence based on a term vector for the term from the term matrix, a context vector for the context from the content matrix, and a weight vector from the factor-weighting matrix.

12. A computer apparatus for producing a document evaluation by ranking contexts within which a word in a corpus appears, comprising:
a processing system; and
a memory,
wherein the processing system is configured to execute steps comprising:
for each word in a corpus, determining a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;
determining a global ranking for each context;
computing a statistic for each context based on one or more of the local ranking and the global ranking;
ordering the one or more contexts based on the computed statistic for each context; and
returning the ordered one or more contexts for use in automatically evaluating a written document.

13. The computer apparatus of claim 12 wherein the global ranking includes an ordering based on the overall frequency of each context in the corpus.

14. The computer apparatus of claim 12 wherein the computed statistic comprises a log rank ratio statistic, wherein the log rank ratio statistic for a context with respect to a word equals the logarithm of the global rank for the context divided by the local rank for the context with the word.

15. A computer apparatus for producing a document evaluation by ranking contexts within which a word in a corpus appears, comprising:
a processing system; and
a memory,
wherein the processing system is configured to execute steps comprising:
for each word in a corpus, determining a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;
determining a global ranking for each context;
computing a statistic for each context based on one or more of the local ranking and the global ranking;
producing a source matrix of words by contexts in which an attribute of each context is used as a value for the context-word combination; and
returning the source matrix for use in automatically evaluating a written document.

16. The computer apparatus of claim 15 wherein the global ranking includes an ordering based on the overall frequency of each context in the corpus.

17. The computer apparatus of claim 15 wherein the computed statistic comprises a log rank ratio statistic, wherein the log rank ratio statistic for a context with respect to a word equals the logarithm of the global rank for the context divided by the local rank for the context with the word.

18. The computer apparatus of claim 15 wherein each value comprises a frequency for the context in the corpus.

19. The computer apparatus of claim 15,
wherein the processing system is configured to generate a term matrix, a factor-weighting matrix and a content matrix from the source matrix.

20. The computer apparatus of claim 19,
wherein the processing system is configured to compute term-term similarity based on a term vector for each term from the term matrix and a weight vector for each term from the factor-weighting matrix.

21. The computer apparatus of claim 19,
wherein the processing system is configured to compute context-context similarity based on a context vector for each context from the content matrix and a weight vector for each context from the factor-weighting matrix.

22. The computer apparatus of claim 19,
wherein the processing system is configured to compute term-context correspondence based on a term vector for the term from the term matrix, a context vector for the context from the content matrix, and a weight vector from the factor-weighting matrix.

23. An article of manufacture comprising a non-transitory computer readable medium, the computer readable medium comprising instructions for generating an automated evaluation of a corpus by ranking contexts within which a word in said corpus appears, the instructions when executed causing a computer to carry out steps comprising:
for each word in said corpus, determining a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;
for each context, determining a global ranking;
computing a statistic for each context based on one or more of the local ranking and the global ranking;
ordering the one or more contexts based on the computed statistic for each context; and
deriving said automated evaluation from said ordered one or more ordered contexts.

24. The article of claim 23 wherein the global ranking includes an ordering based on the overall frequency of each context in the corpus.

25. The article of claim 23 wherein the computed statistic comprises a log rank ratio statistic, wherein the log rank ratio statistic for a context with respect to a word equals the logarithm of the global rank for the context divided by the local rank for the context with the word.

26. An article of manufacture comprising a non-transitory computer readable medium, the computer readable medium comprising instructions for generating an automated evaluation of a corpus by ranking contexts within which a word in said corpus appears, the instructions when executed causing a computer to carry out steps comprising:

for each word in a corpus, determining a local ranking for each of one or more contexts,
wherein each context comprises a word sequence located in a particular arrangement relative to the word, wherein the particular arrangement comprises a relative ordering of the word sequence and the word,
wherein the local ranking comprises an ordering based on the frequency with which each context appears with the word;

for each context, determining a global ranking;

computing a statistic for each context based on one or more of the local ranking and the global ranking;

producing a source matrix of words by contexts in which an attribute of each context is used as a value for the context-word combination; and deriving said automated evaluation from said source matrix of words by contexts.

27. The article of claim 26 wherein the global ranking includes an ordering based on the overall frequency of each context in the corpus.

28. The article of claim 26 wherein the computed statistic comprises a log rank ratio statistic, wherein the log rank ratio statistic for a context with respect to a word equals the logarithm of the global rank for the context divided by the local rank for the context with the word.

29. The article of claim 26 wherein each value comprises a frequency for the context in the corpus.

30. The article of claim 26, the instructions when executed causing the computer to generate a term matrix, a factor-weighting matrix and a content matrix from the source matrix.

31. The article of claim 30, the instructions when executed causing the computer to compute term-term similarity based on a term vector for each term from the term matrix and a weight vector for each term from the factor-weighting matrix.

32. The article of claim 30, the instructions when executed causing the computer to compute context-context similarity based on a context vector for each context from the content matrix and a weight vector for each context from the factor-weighting matrix.

33. The article of claim 30, the instructions when executed causing the computer to compute term-context correspondence based on a term vector for the term from the term matrix, a context vector for the context from the content matrix, and a weight vector from the factor-weighting matrix.

\* \* \* \* \*